Jan. 29, 1957 C. W. LINCOLN ET AL 2,779,199
WINDSHIELD WIPER
Filed May 15, 1951 3 Sheets-Sheet 1

Clovis W. Lincoln
Philip B. Zeigler
Joseph J. Verbrugge
Inventors

By Willits Hardman & Fehr
their Attorneys

Clovis W. Lincoln
Philip B. Zeigler
Joseph J. Verbrugge
Inventors

By Willits Hardman & Fehr
their Attorneys

Jan. 29, 1957  C. W. LINCOLN ET AL  2,779,199
WINDSHIELD WIPER

Filed May 15, 1951  3 Sheets-Sheet 3

Clovis W. Lincoln
Philip B. Zeigler
Joseph J. Verbrugge
Inventors

By Willits, Hardman and Fehr
their Attorneys

United States Patent Office 2,779,199
Patented Jan. 29, 1957

2,779,199
WINDSHIELD WIPER

Clovis W. Lincoln, Philip B. Zeigler, and Joseph J. Verbrugge, Saginaw, Mich., assignors to General Motors Corporation, Detroit, Mich., a corporation of Delaware Application May 15, 1951, Serial No. 226,404

6 Claims. (Cl. 74—70)

This invention relates to windshield wipers for automotive vehicles. Its object is to provide certain improvements in the type of windshield wiper which includes a reversible electric motor and switching means for causing the motor to rotate in one direction at either of two selected speeds for causing the wiper blades to operate through a wiping range. When the switching means is operated to cause the motor to turn in the reverse direction, a mechanism responsive to reversal of the electric motor causes the blades to move to parking position and the circuit of the motor to be interrupted so that the blades stop in parking position.

In the disclosed embodiment thereof, the present invention provides a blade oscillating mechanism which includes a crank arm carrying a crank pin connected by a link which transmits oscillatory movement to a wiper blade. A motor driven shaft provides an eccentric portion on which the crank arm is loosely supported. This shaft is connected with a drive plate having arms which extend oppositely from said shaft and which respectively engage opposite sides of a lug provided by the crank arm. Therefore, when there is a reversal of direction of shaft rotation, there is an interval during which the drive plate moves a partial revolution free of driving engagement with the lug. During this partial revolution, the eccentric portion is shifted angular relative to the shaft axis to change the distance between the crank pin and the shaft. During forward direction of shaft rotation, this distance is less than when the direction of shaft rotation is reversed. The increase in this distance causes the angle of blade wiping action to increase, causes the crank arm to engage a stop when the blade arrives at its parking position and causes the circuit of the electrical shaft-driving motor to be interrupted.

Further objects and advantages of the present invention will be apparent from the following description, reference being had to the accompanying drawings wherein a preferred embodiment of the present invention is clearly shown.

Figure 3:
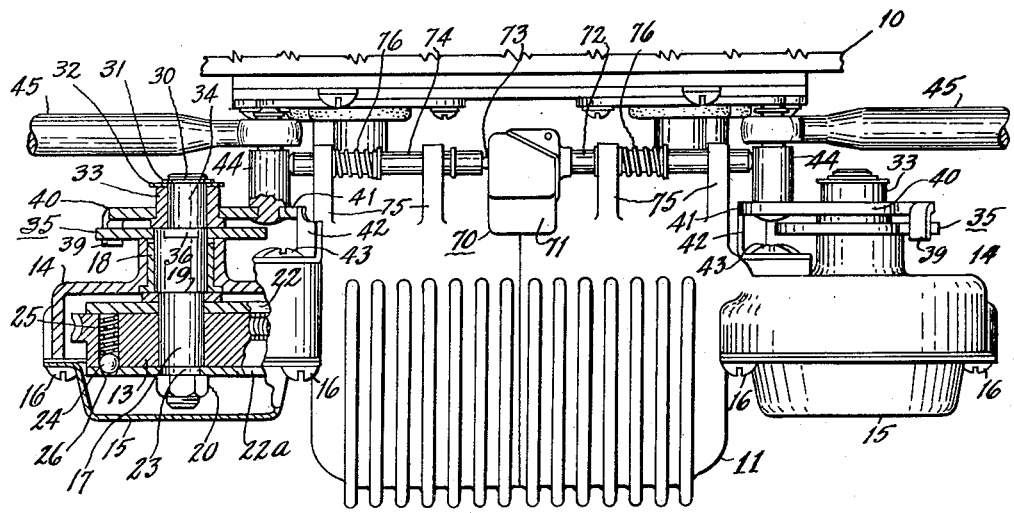
Fig. 3 is a view on line 3—3 of Fig. 2, a portion of one of the driving clutches being broken away showing the clutch in section.
Figure 4:
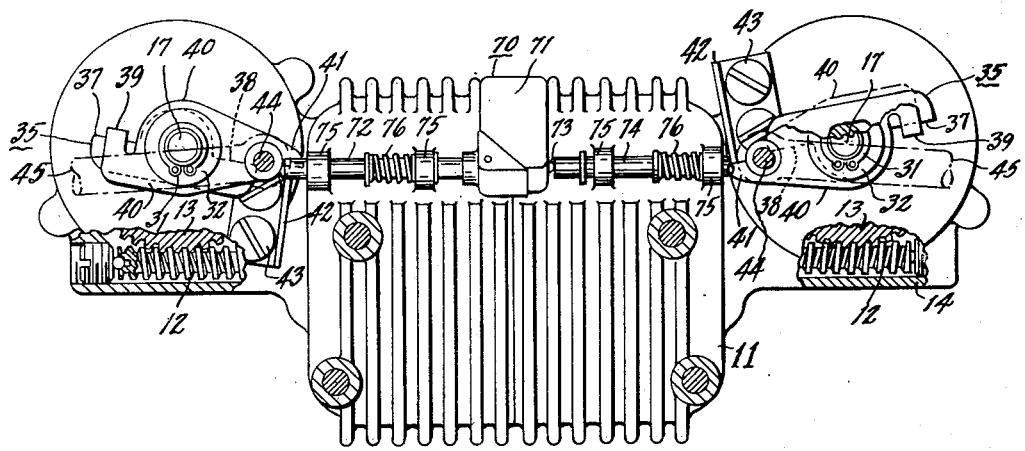
Fig. 4 is a sectional view on line 4—4 of Fig. 2, portions of the gear housing broken away to show the motor driven worms and worm gears.
Figure 5:
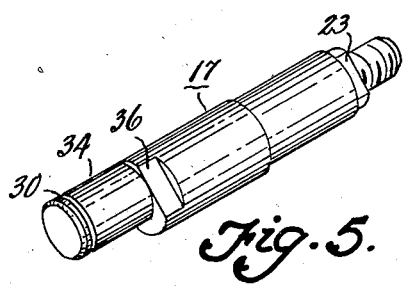
Fig. 5 is a perspective view on an enlarged scale of one of the motor driven shafts.

Referring to Fig. 3, the fire wall 10, which separates the passenger compartment from the engine compartment of the vehicle, supports an electric motor 11 which, as shown in Fig. 4, drives worms 12 meshing with worm gears 13 enclosed in housings 14 integral with the motor frame and closed by covers 15 which are secured to housing 14 by screws 16. Each of worm gears 13 is supported by a shaft 17 (Fig. 3) journaled in a bearing 18 supported by housing 14. Between a shoulder 19 of shaft 17 and a lock nut 20 threaded on shaft 17, there are located a washer 21, a plate 22, the gear 13 and a plate 22a drivingly connected with shaft 17 by providing said shaft with flats 23 extending into an oblong hole in plate 22a. Torque is transmitted from gear 13 to plate 22a by balls 24 which springs 25 urge into conical tapered recesses 26 of plate 22a. In case of obstruction of rotation of shaft 17, the balls 24 will move out of the recesses 26 so that the gear 13 can continue to rotate so long as the motor circuit is completed.

Shaft 17 provides at its upper end, as shown in Fig. 3, a groove 30 which receives a snap ring 31 which retains a washer 32 and a bushing 33 received by a cylindrical portion 34 of shaft 17 which is eccentric to the axis of the shaft. Shaft 17 is connected with a drive plate 35 having an oblong hole receiving flats 36 provided by this shaft 17. Plate 35 provides oppositely extending arms 37 and 38 (Fig. 4) which are engageable, respectively, with opposite sides of a lug 39 provided by a crank arm 40 having a hole which receives the bushing 33 to which the arm 40 is attached. Arm 40 provides a projection 41 which, in the parking position of the wiper blades, engages a stop 42 which screws 43 attach to housing 14.

Figure 1:
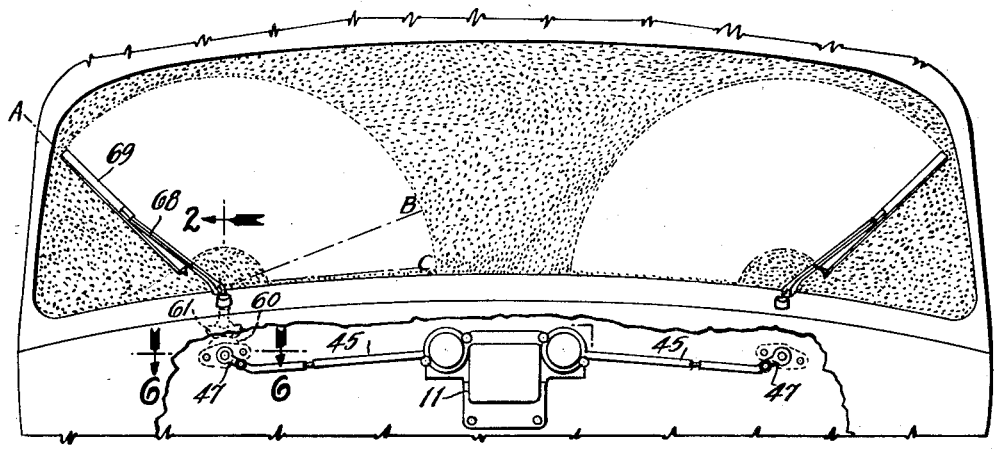
Fig. 1 is a view looking toward the windshield, a portion of the hood being broken away to show the wiper operating motor.
Figure 2:
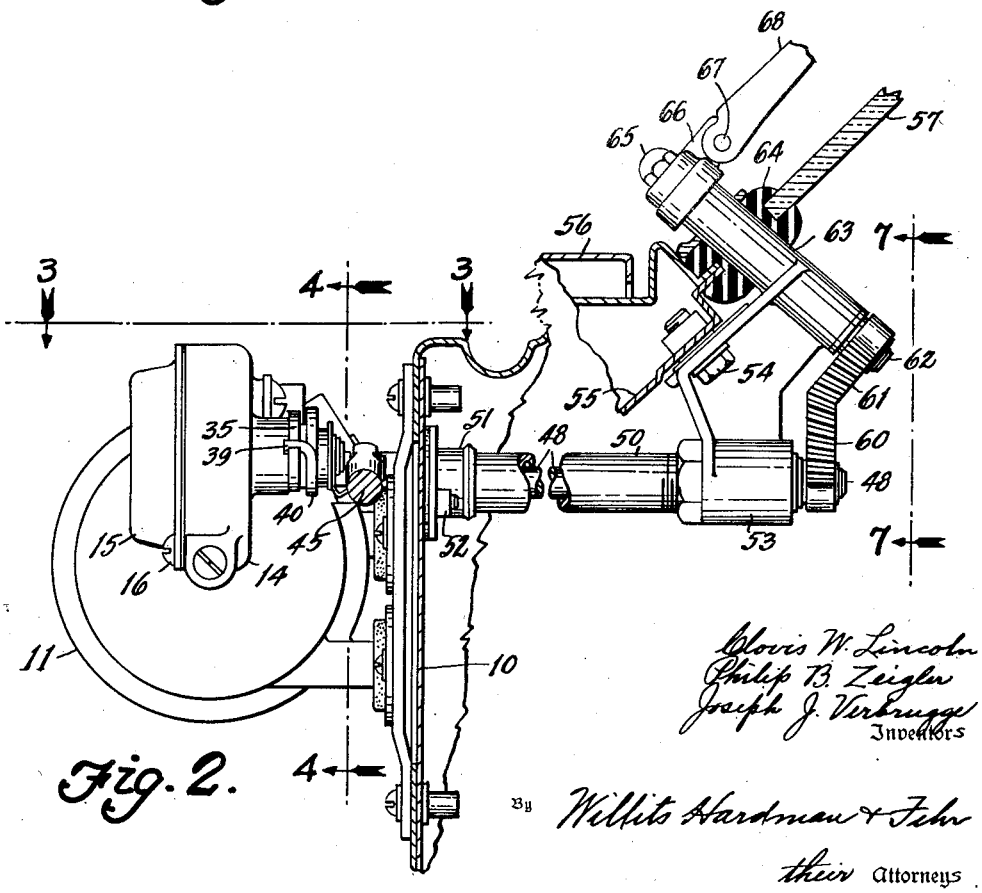
Fig. 2 is an enlarged scale sectional view on planes represented by arrows 2 of Fig. 1.
Figure 6:
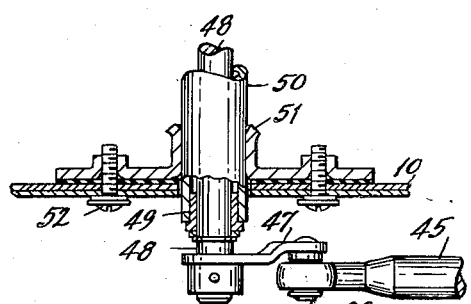
Fig. 6 is an enlarged sectional view on line 6—6 of Fig. 1.
Figure 7:
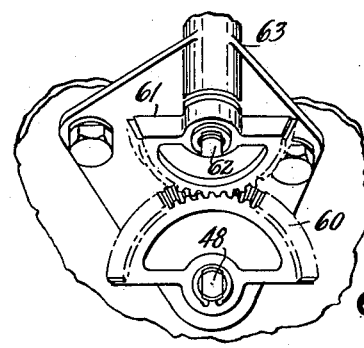
Fig. 7 is a fragmentary view on line 7—7 of Fig. 2.

Each crank arm 40 carries a crank pin 44 connected with a link 45 which, as shown in Fig. 6, is connected by a pin 46 with a lever 47 attached to a shaft 48 journaled in bearings 49 supported by a tube 50 attached at one end to a bracket 51 which screws 52 attached to fire wall 10. As shown in Fig. 2, tube 50 is supported by a bracket 53 which screws 54 attach to a frame 55 which together with member 56 integral with wall 10 supports a windshield 57. Shaft 48, enclosed by tube 50 is connected by bevel gears 60 and 61 with a shaft 62 also rotatably supported by a portion 63 of bracket 53. Portion 63 extends through a rubber grommet 64 to the outside of the windshield. A screw 65 secures to shaft 62 a lever 66 carrying a pin 67 which connects a wiper arm 68 with lever 66. As shown in Fig. 1, arm 68 carries a wiper blade 69.

The electric motor turns the worms 12 (Fig. 4) in relatively opposite directions and the worm gears 13 in the same relative directions either in forward direction or in reverse direction depending on the control by switching means to be described. The forward direction is the normal or windshield wiping direction and the reverse direction is that required for stopping the wiping blades in parking position. When the worms 12 turn in the reverse direction, the two shafts 17 turn clockwise so that the arms 37 of drive plates 35 engage lugs 39 of cranks 40. Clockwise rotation of shafts 17, as viewed in Fig. 4, has caused crank arms 40 to move toward each other so that the projections 41 thereof will engage stops 42 at the time when the wiper blades are in parked position. The motor is caused to stop by the opening of a limit switch 70 whose case 71 is supported by rod 72 and whose switch opening plunger 73 is engaged by a rod 74. Rods 72 and 74 are in alignment and are supported for axial movement by lugs 75 integral with the frame of motor 11. When the crank pins 44 are in positions corresponding to parked positions of the wiper blades, rods 72 and 74 are located by crank pins 44 in such positions that the switch 70 opens and the motor stops.

When windshield wiping is desired, a switching means is manually conditioned to cause the motor to turn shafts 17 and plates 35 counterclockwise (Fig. 4). As the shafts 17 start turning in this direction, their eccentrics 34 cause the arms 40 to move away from one another and away from the stops 42 and the arms 38 of plates 35 engage the lugs 39 of arms 40 to effect counterclockwise rotation of crank pins 44 whose axes are then closer to the axis of shaft 17 than when the mechanism is in blade parking position, as shown in Figs. 3 and 4. Therefore, the normal blade wiping range is between the radial lines A and B (Fig. 1), line C representing the park position of the blades. The movement of the crank pins 44 closer to the axes of shafts 17 during the initial counterclockwise rotation of these shafts, permits springs 76 and 77 to move rods 72 and 74 into such positions that the switch 70 closes.

Figure 8:
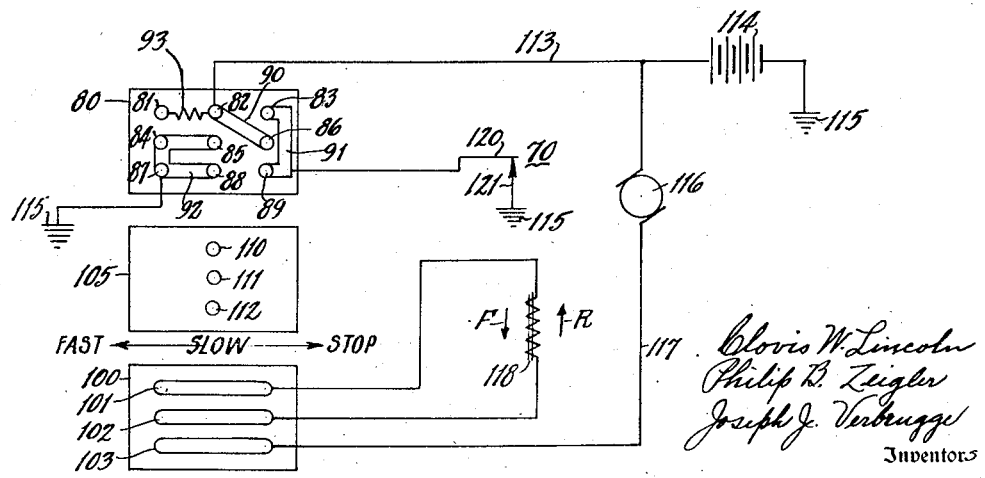
Fig. 8 is a wiring diagram of circuit connections provided by the switch means.

The switching mechanism will now be described with respect to the wiring diagram shown in Fig. 8. The switch includes a non-conducting plate 80 which supports contacts 81, 82, 83, 84, 85, 86, 87, 88 and 89. A strap 90 connects contacts 82 and 86. A strap 91 connects contacts 83 and 89. A strap 92 connects contacts 84, 85, 87 and 88. A resistance 93 connects contacts 81 and 82. This switch includes a fixed non-conducting plate 100 which supports metal straps 101, 102 and 103, and a manually operated non-conducting plate or contact carrier 105 which carries contacts 110, 111 and 112. The three plates 80, 105 and 100, which are shown in the vertical row in Fig. 8, are in fact stacked together, the plate 105 being movable between plates 80 and 100. Plate 105 is movable horizontally in Fig. 8 either to the left or to the right of the intermediate position shown in Fig. 8. In all positions of plate 105, contacts 110, 111 and 112 engage, respectively, straps 101, 102, 103. In the mid-position of plate 105, contacts 110, 111 and 112 engage contacts 82, 85 and 88, respectively. In a position of plate 105 to the left of mid-position, contacts 110, 111 and 112 engage contacts 81, 84 and 87, respectively. In the position of plate 105 to the right of mid-position, contacts 110, 111 and 112 engage contacts 83, 86 and 89, respectively. Contact 82 is connected by wire 113 with battery 114 grounded at 115. Wire 113 is connected with armature 116 of the electric motor, this armature being connected by wire 117 with strap 103. The field winding 118 of the motor is connected with straps 101 and 102. Strap 92 is connected with ground 115. Strap 91 is connected with one contact 120 of switch 70 and the other contact 121 is connected with ground 115.

When plate 105 is in the mid position shown in Fig. 8, the switch is conditioned for slow speed operation of the motor in the forward direction. The following circuits are completed: battery 114, wire 113, contact 82, contact 110, strap 101, motor field coil 118, strap 102, contact 111, contact 85 and ground 115. Current flows through field coil 118 in a direction represented by an arrow F, this being the direction when the motor rotates in the forward direction for windshield-wiping. For faster operation of the windshield wiper, the plate 105 is moved to the left of the position shown in Fig. 8 and the following circuit is completed: battery 114, wire 113, contact 82, resistance 93, contact 81, contact 110, strap 101, field coil 118, strap 102, contact 111, contact 84 and ground 115. The resistance having been inserted in the circuit of field 118, the motor operates at greater speed. In either the mid-position of plate 105 or in a position to the left of mid-position, the following armature circuit is completed: battery 114, armature 116, wire 117, strap 103, contact 112 and either the contact 88 or the contact 87 to ground 115.

When stopping the windshield wiper at the parked position of its blades, the plate 105 is moved to the right of mid position and the following circuits are established: battery 114, wire 113, contact 82, strap 90, contact 86, contact 111, strap 102, field coil 118, strap 101, contact 110, contact 83, strap 91, limit switch 70 and ground 115. When these connections are made, current flows through the field coil 118 in the direction represented by arrow R, which is the direction for reversed rotation of the motor. The motor armature circuit includes battery 114, armature 116, wire 117, strap 103, contact 112, contact 89, limit switch 70 and ground 115. As stated before, reversal of rotation of the motor causes the wiper blades to move to parked position represented by radial line C (Fig. 1), the crank arms 39 being against the stops 41 and the motor is caused to stop by the automatic opening of switch 70 in the manner described.

From the foregoing description of the construction and mode of operation thereof, it is apparent that the present invention provides for increasing the effective throw of a crank arm when stopping of the wiper blade in parking position is desired, the increasing of the effective throw of the crank arm causing it to be located for engagement with a fixed stop and, concurrently, for opening a switch in the circuit of the electrical driving motor; and that the invention provides for decreasing the effective throw of the crank arm when wiping is desired so that the arm is retracted from the stop and the switch is permitted to close by its own action. The decrease in effective throw of the crank arm is effected automatically in response to operation of the arm operating electric motor in a forward or normal wiping direction, said motor being controlled for such direction of rotation by a manually controlled switch which removes control of the motor by the normally closed switch which was opened when the wiper blade had arrived in parking position. The increase in effective throw of the crank arm is effected automatically in response to operation of the motor in the reverse direction, which operation is effected by an actuation of the manually controlled switch which restores control of the motor by said normally closed switch. The change in effective throw of the crank arm is obtained automatically in response to reversal of direction of motor rotation by the combination comprising a motor driven shaft 17 which provides a cylindrical portion 34 eccentric to the shaft axis and upon which the crank arm 40 is loosely mounted, a driving plate 35 connected with the shaft and having arms 37 and 38 extending oppositely from the shaft and respectively engageable with a member 39 of crank arm 40 depending upon the direction of rotation of the plate 35, reversal of shaft rotation causing the crank arm 40 to move laterally of the shaft 17 prior to engagement of a driving plate arm, 37 or 38, with the member 39.

While the embodiment of the present invention as herein disclosed, constitutes a preferred form, it is to be understood that other forms might be adopted.

What is claimed is as follows:

1. In a windshield wiper operating mechanism, the combination comprising a reversible electric motor, a crank operating shaft having an eccentric driven by the motor in either direction, a driving plate connected with the shaft, said plate having arms extending oppositely from the axis of the shaft, a crank arm rotatably mounted upon a portion of the shaft eccentric to the axis of the shaft and providing a member for engagement by one or the other of the driving plate arms depending on the direction of rotation of the shaft, reversal of shaft rotation causing the crank arm to move radially of the shaft prior to engagement of a driving plate arm with the crank arm member, a crank pin attached to the arm in a position such that, during forward direction of rotation of the shaft, the crank throw is less than during the reverse direction of rotation, a stop engaged by the crank arm at the end of reverse movement thereof, and means for controlling the direction of motor operation.

2. In a windshield wiper operating mechanism, the combination comprising an electric motor, a normally closed switch in circuit with the motor, a shaft rotated by the motor in either direction, said shaft having a cylindrical portion eccentric of the shaft, a driving plate mounted on the shaft and having two arms extending oppositely from the axis of the shaft, a crank arm rotatably mounted on the eccentric portion and having a lug extending into the path of movement of the arms, one side of the lug being engaged by one driving plate arm during rotation of the shaft in one direction and the other side of the lug being engaged by the other driving plate arm during rotation of the shaft in the opposite direction, reversal of direction of shaft rotation causing the crank arm to move radially of the shaft prior to engagement of a driving plate arm with the lug so as to increase the throw of said crank arm, a crank pin carried by the crank arm, a fixed stop in the path of movement of the crank arm when its throw is the greater, means for transmitting motion to the switch to open it concurrently with movement of the crank arm against the stop, and means for controlling the direction of motor operation.

3. In a windshield wiper operating mechanism, the combination comprising a reversible electric motor, two shafts driven by the motor in either direction, each shaft having a cylindrical portion eccentric of the shaft, a driving plate mounted on each shaft and having two arms extending oppositely from the axis of the shaft, a crank arm rotatably mounted on each eccentric portion and having a lug extending into the path of movement of the arms, reversal of shaft rotation causing the crank arm to move radially of the shaft prior to engagement of a driving plate arm with the lug so as to increase the throw of said crank arm, a crank pin carried by each crank arm, fixed stops in the path of movement of the crank arms when their throws are the greater, a normally closed switch in the motor circuit and having an actuator mounted for movement in a direction to open the switch and having a case supported for movement parallel to the direction of movement of the actuator, devices respectively for transmitting motion in opposite directions to the switch case and to the switch actuator concurrently with movement of the two crank arms against the two stops, and means for controlling the direction of motor operation.

4. Windshield wiper actuating mechanism including, a reversible driving member having an eccentric portion, a driven member, variable throw crank mechanism rotatably journalled on the eccentric portion of said driving member and having operative connection with said driven member, said crank mechanism having an abutment thereon, and means including a lost motion mechanism for transmitting movement between said driving member and said crank mechanism through said abutment whereby the crank throw is dependent upon the direction of motion of said driving member.

5. Windshield wiper actuating mechanism including, a reversible driving member having an eccentric portion, a driven member, variable throw crank mechanism rotatably journalled on the eccentric portion of said driving member and having operative connection with said driven member, and means including a lost motion mechanism for transmitting movement between said driving member and said crank mechanism whereby the crank throw is dependent upon the direction of motion of said driving member.

6. Windshield wiper actuating mechanism including, a reversible driving member, a driven member, variable throw crank mechanism rotatably journalled on said driving member and having operative connection with said driven member, and means including an element connected to said driving member and having a pair of diametrically opposed, radially extending arms for transmitting movement between said driving member and said crank mechanism, only one of said arms being capable of driving engagement with said crank mechanism at a time whereby the crank throw is dependent upon which of said arms is in driving engagement with said crank mechanism.

References Cited in the file of this patent

UNITED STATES PATENTS

| Number | Name | Date |
|---|---|---|
| 546,419 | Dean | Sept. 17, 1895 |
| 2,046,171 | Lauer | June 30, 1936 |
| 2,173,447 | Horton | Sept. 19, 1939 |
| 2,308,212 | Scott-Iverson | Jan. 12, 1943 |
| 2,359,553 | Fuller | Oct. 3, 1944 |
| 2,452,496 | Schneider | Oct. 26, 1948 |
| 2,491,697 | Vischulis | Dec. 20, 1949 |
| 2,499,298 | Christensen | Feb. 28, 1950 |
| 2,513,247 | Morton | June 27, 1950 |
| 2,651,802 | Kearful | Sept. 15, 1953 |